Aug. 7, 1956 G. CANEGALLO 2,758,183
PROCESS FOR MAKING ELECTRIC RESISTORS AND ELECTRIC
RESISTORS MADE WITH THAT PROCESS
Filed March 3, 1953 2 Sheets-Sheet 1
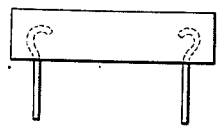
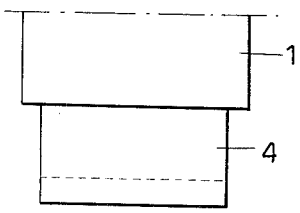
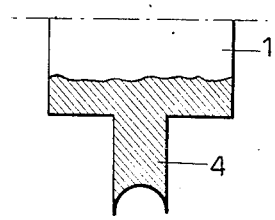
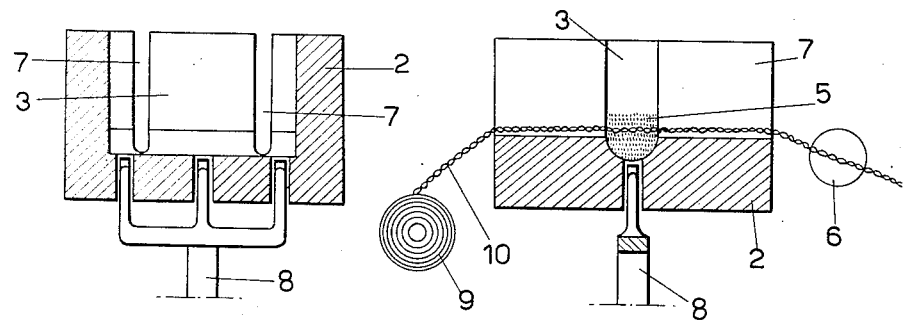
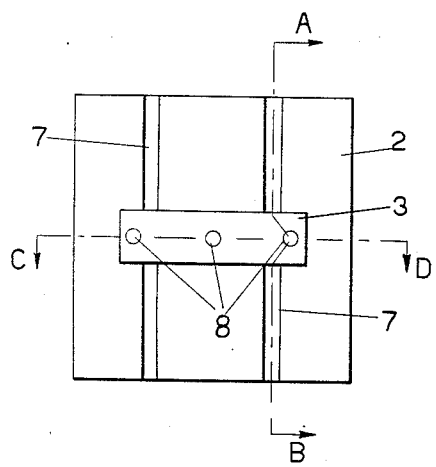
INVENTOR
GIOVANNI CANEGALLO
BY
ATTORNEY Aug. 7, 1956               G. CANEGALLO            2,758,183
PROCESS FOR MAKING ELECTRIC RESISTORS AND ELECTRIC
RESISTORS MADE WITH THAT PROCESS
Filed March 3, 1953                                        2 Sheets—Sheet 2
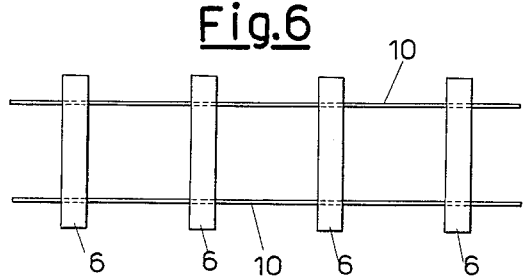
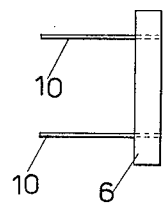
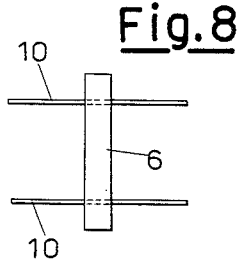
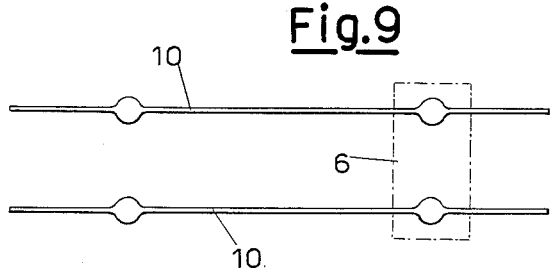
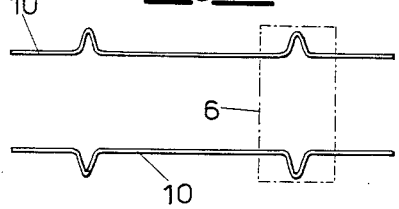
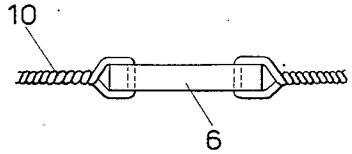
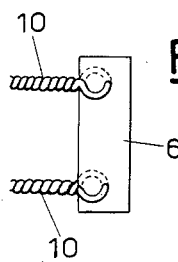
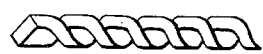
INVENTOR
GIOVANNI CANEGALLO
BY
ATTORNEY United States Patent Office 2,758,183
Patented Aug. 7, 1956

2,758,183

PROCESS FOR MAKING ELECTRIC RESISTORS AND ELECTRIC RESISTORS MADE WITH THAT PROCESS

Giovanni Canegallo, Milan, Italy, assignor of one-half to S. E. C. I. Societa Elettrotecnica Chimica Italiana, Milan, Italy Application March 3, 1953, Serial No. 340,021

Claims priority, application Italy March 5, 1952

10 Claims. (Cl. 201—63)

Electric resistors constituted by a mixture of synthetic resins with conducting materials such as graphite and carbon black and inert substances such as asbestos powder or kaolin, compressed and hot moulded, are well known and much employed especially in radio sets and in general in electronic devices.

The manufacture of these resistors is carried out with processes similar to those normally employed for the production of moulded articles of thermosetting or thermoplastic synthetic resins.

These resistors have generally the shape of small rolls having circular or polygonal cross-section and their dimensions are the much larger, the much higher the power is they have to dissipate.

In all these resistors, the terminal rheophores or leads are generally constituted by wires or strips or tongues of metal, applied to the opposed ends of the resistor body.

In some types, the terminals are applied on the external surface of the resistor by means of mechanical forcing using in this case metallic caps or collars of suitable size and shape.

In other cases, when wire terminals are selected, these are wound up on the resistor heads, if needed after previous metallization with siutable coatings or other methods and are then locked by means of tin soldering.

Another more modern way of applying the rheophores consists in introducing into the body of the resistor the rheophores in such a manner that these come to be immersed and clamped within the material constituting the resistor. The technique used in this case is equal or similar to that employed to introduce metallic members into articles moulded with synthetic resins. It is well known that in order that the metallic parts may remain well anchored and fixed within the body of moulded synthetic resin, it is necessary for the metallic part immersed into the moulded mass to have concavities or some projection and may have a rough surface so that the resin mass, which under the action of heat and of mechanical pressure of moulding becomes fluid, may creep into the sinuosities of the metal member.

Besides what has been set forth hereinbefore, in order that the metallic rheophore may be well anchored in the body of the resistor and the electric contact may not undergo any variations that might cause alterations in the value of the resistance it is also necessary that the rheophore may be immersed into the body of the resistor over a sufficient length.

In modern resistors, the dimensions of which are sensibly reduced as compared to those of the resistors of some years ago, and with the present trend to further reduce said dimensions, the anchoring of the metallic rheophores in the resistor body becomes more and more critical owing to the small dimensions of the pieces, which have about a diameter of 3.5 mm. and a length of about 10 mm. for a dissipation of ½ watt. Considering the resistors in which the rheophores of metal wire are arranged transversally or axially as indicated hereinafter, for the reasons set forth above it is necessary that said rheophores have a thickening or a bend in the end immersed in the body of the moulded piece.

To embody resistors made in this way, the rheophores must be made with mechanical processes requiring complicated and costly equipment.

With the process according to the present invention there are obtained considerable advantages of saving in the making of said resistors and sensible improvements in their electric and mechanical characteristics.

The characteristic feature distinguishing the process of the present invention consists in that a plurality of resistors are moulded spaced apart from one another on a pair of metallic conductors arranged parallel to each other, which conductors after that moulding operation are cut between one resistor and the other.

Some examples of how the above defined process can be embodied in practice, are described hereinafter with reference to the accompanying drawings, wherein:

Figures 1 and 2 show two resistors of known type;

Figures 3, 4 and 5 show respectively in two vertical sections and in plan a mould for carrying out said process;

Figure 6 shows a series of resistors obtained with the process of the invention;

Figures 7 and 8 show two resistors obtained by dividing the series of Fig. 6 at two different points;

Figures 9 and 10 show two different types of deformation of the conductors;

Figures 11 and 12 show two different ways of uniting the ends of the conductors;

Figures 13 and 14 show two types of conductors.

With reference to the Figures 3, 4 and 5, wherein, as said, there is represented in front section, in cross section and in plan a press for the moulding of resistors, with 1 is indicated the plunger and with 2 the matrix of the moulding device. The latter contains a groove 3 into which there penetrates the mould 4.

The mould and the matrix are shaped in such a manner that if pressed against each other they compress the powder of synthetic resin 5 deposited on the bottom of the matrix in such a way as to form the resistor 6. In the drawing, the resistor 6 is circular, but of course also other shapes of cross-section can be obtained, such as square, polygonal or any other.

The matrix is passed through in its whole length, in a direction at right angle to the axis of the groove 3 and near to the two ends of said groove, by two channels 7. Under the matrix there is accommodated the ejector 8 destined to remove the moulded resistors from the groove.

The manufacture of the resistor takes place in the following manner: from the roll 9 on which there are fitted two skeins of metal wire or of strand 10, suitable lengths of wire are unreeled and the ends of the two wires 10 are introduced into the channels 7 keeping them tensioned.

Subsequently the powder 5 of synthetic resin mixed with the ingredients required, for forming the resistor, is introduced into the groove 3 of the matrix in the necessary amount, then the mould is lowered and the powder is compressed, following as for temperature and pressure the well known specifications of the technique of thermosetting and thermoplastic resin moulding.

After polymerizing, and after extracting the mould 4, actuating the ejector 8, the moulded resistor is ejected from the groove and it is displaced towards the right beyond the matrix, unreeling from the rolls 9 a certain length of wire, which is accommodated again in the bottom of the channels 7, then powder is again introduced into the groove 3 and a new resistor is moulded and so on.

In this way, a chain of resistors is formed like that indicated in Fig. 6, which chain is wound up on another roll not shown in the drawing.

It is evident that with this method it is possible to mould one single resistor a time or to mould two or more such resistors contemporaneously by means of multiple moulds. It is also possible and without any difficulty to make dividers, that is resistors having besides the two terminal rheophores also other rheophores intermediate in respect to the ends. After the moulding operation and if it is desired even after any other subsequent operations of baking, varnishing or printing, the resistors are detached from this sort of chain with wide links, by cutting the metallic terminals at any point, for example immediately at the exit of the terminals from the resistor body, in which case resistors of the type illustrated in Fig. 7 are obtained, or at an intermediate point, in which case the finished resistor appears as shown in Fig. 8.

In this latter case, the resistor may be finished by stranding the two rheophores with each other as indicated in Fig. 11, or as indicated in Fig. 12.

As for the material to be employed for the making of resistors of the kind described, some formulae are given herein of composition merely by way of example and without excluding thereby from the scope of the invention the possible embodiments of resistors with materials having other composition or character.

Resistors may be considered having a diameter of about 4.5 mm. and a length of about 12 to 13 mm. with terminal rheophores of tinned copper wire of 0.7 mm. diameter, distant from one another 9 to 10 mm., to obtain for example resistances of from 1000 to 10,000 ohm, the following composition may be employed:

|  | Grams |
|---|---|
| Bakelite resin powder | 25 |
| Silica powder | 50 |
| Graphite | 25 |
|  | 100 |

To obtain resistances of from 100,000 ohm to 2 megaohm, one may use

|  | Grams |
|---|---|
| Bakelite resin powder | 20 |
| Silica powder | 75 |
| Carbon black | 5 |
|  | 100 |

These powders have to be mixed with one another and then used by compressing them at 100/200 kg./mm.² at a temperature between 180 and 230° C. and for a baking time lasting from 15 to 60 seconds.

The two metallic conductors constituting the terminals of the resistors may be constituted simply by wires having circular or polygonal cross-section, or by strips of suitable size.

In the case of wires having circular or polygonal cross-section, these must have the diameter of the maximum transversal dimension not much larger than half the diameter of the rod constituting the resistor, in order not to weaken excessively the resistor in the region where it is passed through by the rheophores.

Since in this new resistor the rheophores are immersed into the body of the resistor over the whole thickness of the said resistor, they are thus already sufficiently well locked mechanically and, therefore, provide a good and non-variable electric contact.

If it is desired to further improve both the mechanical anchoring and the electric contact, one may shape for example by squeezing or bending the wire in the region in which it will be immersed in the resistor mass, as indicated merely by way of example in Figures 9 and 10.

Anchoring of the rheophores within the body of the resistor may also be obtained employing instead of one single wire for each terminal a strand of two or three wires stranded with one another as indicated in Fig. 13 or a wire having triangular, square or polygonal cross-section twisted helically as indicated in Fig. 14.

These terminals are described in applicant's co-pending U. S. application, Serial Number 340,363, dated March 4, 1953, and can be utilized to advantage herein— remaining well locked within the body of the resistor because the surface of the terminal offers recesses into which the resistor mass, rendered fluid by heat and pressure during the moulding operation, can creep.

From what has been described hereinbefore, it appears evident that with this new resistor and with the respective manufacturing method it is possible to practice a series production with smaller expenses for equipment because the use of two continuous conductors for the terminals avoids the sensible complications and, therefore, the expenses for equipment, operation and maintenance for the separate making of the terminal rheophores, which moreover have then to be taken one by one and accommodated conveniently within the seats or supports to be provided especially for this purpose, in order to apply them to the resistor body.

What I claim is:

1. A method of mass producing electrical resistors having conductive terminals which comprises placing a mixture including a comminuted conductor and a binding agent into a series of moulds, embedding a pair of parallel elongated conductors transversely through the mixtures in said molds, thereupon pressure molding the mixtures into coherent resistor bodies encompassing and anchored to said conductors, removing the bodies and the portions of the conductors to which they are affixed from the molds so that successive sections of the conductors traverse the series of molds, forming coherent bodies thereon, and cutting the pair of conductors so that a plurality of resistors are obtained each having conducting terminals projecting therefrom.

2. A method of mass producing electrical resistors having conductive terminals which comprises placing a mixture comprising a comminuted conductor and a binding agent into a series of molds, embedding a pair of parallel elongated conductors transversely through the mixtures in said molds, molding the mixtures into coherent resistor bodies mounted on said conductors, removing the bodies and the portions of the conductors to which they are affixed from the series of molds so that successive sections of the conductors traverse the series of molds, again forming coherent bodies thereon, cutting the pair of conductors so that a plurality of bodies are obtained each having conducting terminals projecting therefrom, and interlacing the projecting terminals of each conductor whereby a plurality of resistors having conductive terminals are obtained.

3. In a method of mass producing electrical resistors having conductive terminals, the steps of placing a mixture comprising a comminuted conductor and a binding agent into a series of molds, embedding a pair of elongated parallel conductors transversely through the mixtures in said molds, thereupon pressure molding the mixtures into coherent bodies encompassing and anchored to said conductors, removing the bodies and the portions of the conductors to which they are affixed from the molds so that successive sections of the conductors traverse the series of molds, again forming coherent bodies thereon, and cutting the pair of conductors whereby a plurality of bodies are obtained each having conducting terminals projecting therefrom.

4. In a method of mass producing electrical resistors having conductive terminals, the steps of placing a mixture comprising a comminuted conductor and a binding agent into a series of molds, embedding a pair of elongated parallel conductors transversely through the mixtures in said molds, and thereupon pressure molding the mixtures into coherent bodies encompassing and anchored to said conductors.

5. In a method of mass producing electrical resistors having conductive terminals, the steps of placing a mixture comprising a comminuted conductor and a binding agent into at least one mold, embedding a pair of elongated parallel conductors transversely through the mixture in said mold, thereupon pressure molding the mixture into a coherent body encompassing and anchored to said conductors, removing the body and the portion of the conductors to which it is affixed from the mold so that successive sections of the conductor traverse the mold, forming a second coherent body thereon, and cutting the pair of conductors whereby a plurality of bodies are obtained each having conductive terminals projecting therefrom.

6. In a method of producing electrical resistors having conductive terminals, the steps of placing a mixture comprising a comminuted conductor and a binding agent into a mold, embedding a pair of elongated parallel conductors transversely through the mixture in said mold, and thereupon pressure molding the mixture into a coherent body encompassing and anchored to said conductors.

7. A method of producing electrical resistors having conductive terminals which comprises placing a mixture comprising a comminuted conductor and a binding agent into a mold, embedding a pair of elongated parallel conductors transversely through the mixture in said mold, thereupon pressure molding the mixture into a coherent body encompassing and anchored to said conductors, and cutting the pair of conductors so that a resistor is obtained having conductive terminals projecting therefrom.

8. The method according to claim 7 where each of said elongated conductors is formed by twisted wires.

9. The method according to claim 7, where each of said elongated conductors is formed by stranded metal strips.

10. The method according to claim 7, wherein each of said elongated wires has an expanded portion situated within said mixture.

References Cited in the file of this patent

UNITED STATES PATENTS

| | | |
|---|---|---|
| 1,667,857 | Harpster et al. | May 1, 1928 |
| 1,913,272 | Graf | June 6, 1933 |
| 2,176,604 | Benkelman | Oct. 17, 1939 |
| 2,253,577 | Pearson et al. | Aug. 26, 1941 |